July 19, 1966  G. MYSKA  3,261,312
VALVE SYSTEM FOR CONTROLLING A PRESSURE FLUID
TO A THREAD CUTTER
Filed March 10, 1964  2 Sheets-Sheet 1
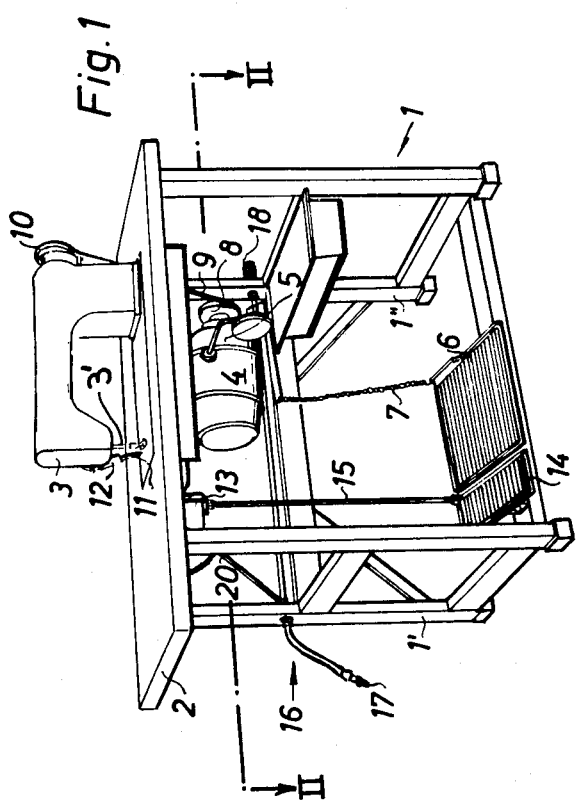
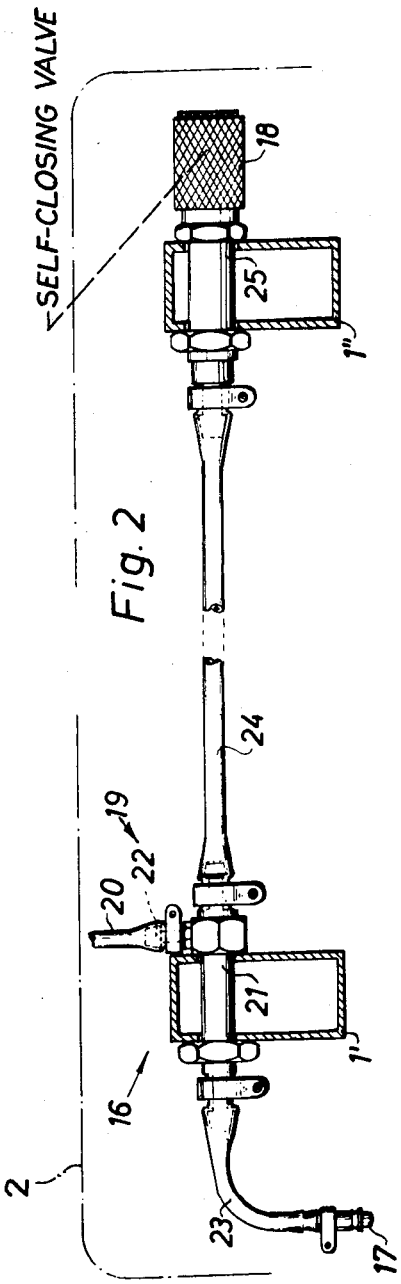
INVENTOR.
GÜNTER MYSKA
BY
AGENT

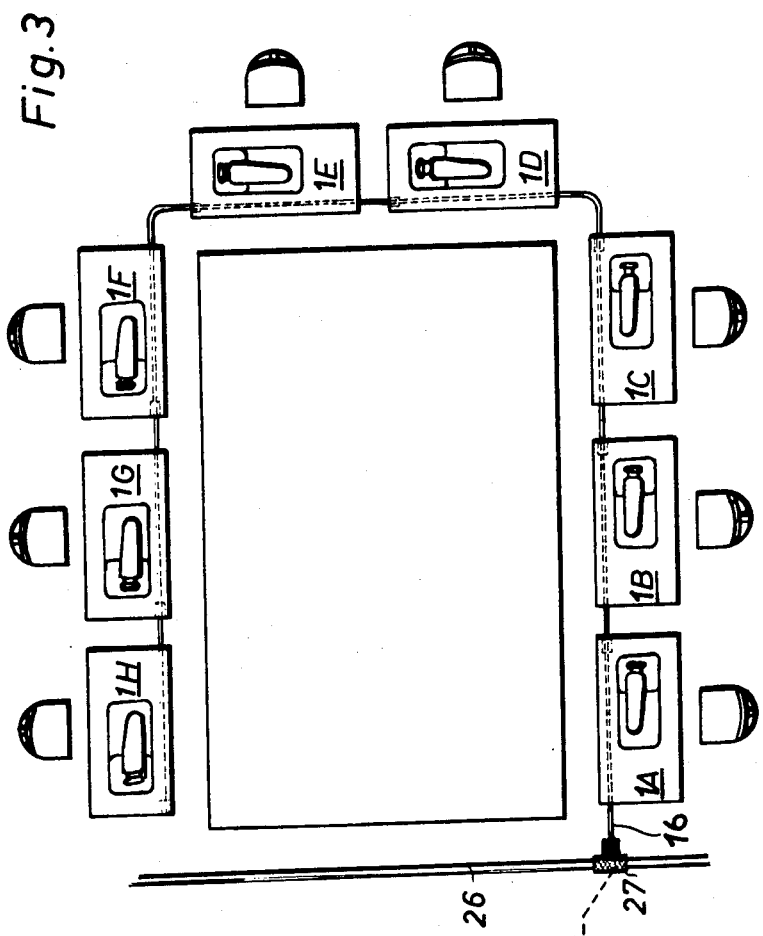

United States Patent Office 3,261,312
Patented July 19, 1966

3,261,312
VALVE SYSTEM FOR CONTROLLING A PRESSURE FLUID TO A THREAD CUTTER
Günter Myska, Bielefeld, Germany, assignor to Dürkoppwerke Aktiengesellschaft, Bielefeld, Germany, a corporation of Germany
Filed Mar. 10, 1964, Ser. No. 350,702
Claims priority, application Germany, Mar. 14, 1963, D 26,486
3 Claims. (Cl. 112—252)

My present invention relates to a supply system for the delivery of a pneumatic fluid to one or more loads, particularly for industrial plants in which the loads are individually operable implements on an array of substantially identical machines.

In sewing machines, for example, an implement of this type may be a pneumatically operated thread cutter controlled manually or automatically, e.g. as more fully disclosed in my copending application Ser. No. 347,433, filed February 26, 1964 under the title "Valve System for Controlling a Pressure Fluid."

In such installations, especially with mobile machines which may be shifted from one place to another or occasionally taken out of service, it will be convenient to have available a central supply of compressed air, steam or other pneumatic fluid to which the several implements may be individually attached as needed. The general object of my invention is to provide a pneumatic system facilitating such selective attachment.

A particular object of this invention is to provide means on industrial machines, specifically sewing machines, enabling selective connection of any number thereof in series to a common fluid supply for the energization of respective implements carried on these machines.

These objects are realized in accordance with the instant invention by the provision of a main fluid-supply line with one or more outlets, each advantageously having the shape of a female coupling member or socket, provided with a self-closing valve which is held only upon the insertion of a complementary line termination, advantageously a male coupling member or plug, and which otherwise seals the outlet against escape of fluid. Each of the machines to be served by this supply line is, in turn, provided with a tube supported by the machine frame and equipped on opposite sides of that frame with a male and a female termination, respectively, one—preferably the female—termination being again fitted with a self-closing valve and adapted to receive the complementary termination of another machine connected in series therewith. To facilitate interchangeability in the preferred system according to my invention, the female terminations are substantially identical with the outlet of the main supply line so that any male termination may be selectively plugged into the female termination of another machine or into the aforesaid outlet. Self-closing valves of the type referred to are, of course, well known in the art. Reference may be made, for example, to U.S. Patent No. 2,279,146 (Schneller), showing a female coupling of this type, and U.S. Patent No. 2,706,646 (Olson), showing both a male and a female termination of a self-closing valve type.

These and other features will become more fully apparent from the following detailed description of a preferred embodiment, reference being made to the accompanying drawing in which:

FIG. 1 is a perspective view of a sewing machine equipped with a pneumatic line forming part of a system according to the invention.

FIG. 2 is a fragmentary sectional view, drawn to a larger scale, on the line II—II of FIG. 1; and FIG. 3 is a top plan view of an array of several machines, each similar to that of FIG. 1, connected in a pneumatic circuit according to the invention.

The sewing machine shown in FIG. 1 comprises a frame composed essentially of a table top 2 and four legs of which two, spaced laterally, have been designated 1' and 1". The table top 2 supports a conventional sewing machine 3 which is driven by a motor 4, suspended from the underside of plate 2, by way of a retractable friction clutch 5 controlled by a pedal 6 through the intermediary of a chain 7; a sheave 8, powered by motor 4 via the clutch 5, is linked by a V-belt 9 with a pulley 10 on the body of machine 3. The latter includes a knife 11 in the vicinity of its needle 3', this knife being actuatable by a pneumatic motor 12 (see application Ser. No. 347,433 or U.S. Patent No. 2,681,102) to sever a thread between two adjoining workpieces. The pneumatic motor 12 is energized through a conduit 20 by way of a valve 13 which the operator controls with the aid of a pedal 14 linked with the valve 13 through a rod 15. The construction of valve 13, which is of no significance for purposes of the instant disclosure, may be as shown and described in my aforementioned copending application.

The conduit 20 is preferably flexible tube forming a junction 19 with a branch line 16 of a supply system shown more completely in FIG. 3. The branch line 16, as best seen in FIG. 2, is horizontally supported by the table legs 1' and 1" which are of rectangular profile and traversed by short connecting pipes 21 and 25, respectively, the main tube section 24 extending between these legs at the rear of the machine frame whose plate 2 has been partly illustrated in dot-dash outline in FIG. 2. The junction 19, inserted between connector 21 and tube 24, includes a nipple 22 to which the conduit 20 is removably attached. A flexible extension 23 of tube 24, ahead of the leg 1', has its free end formed into a male termination or plug 17 complementary to a female termination or socket 18 at the free end of connector 25 beyond leg 1".

A main supply line 26, FIG. 3, includes a T-junction 27 forming a socket-shaped outlet identical with the female termination 18 of branch line 16; plug 17 is, accordingly, insertable into either the outlet 27 or the termination 18 on another sewing-machine frame, the plug being, of course, retainable in its socket by suitable detent means known per se.

As shown in FIG. 3, a plurality of sewing machines with supports designated 1A through 1H are arrayed around a work station and are serially connected by a common branch line 16 to the supply line 26, line 16 being thus composed of eight sections which are detachably interconnected and are each identical with the one particularly illustrated in FIGS. 1 and 2. The outlet 27 of supply line 26, the female termination 18 of each section and, if desired, the nipple 22 of each junction 19 are provided with self-closing valves of the type described. It will be readily apparent that any of the machine tables 1A–1H may be removed from the array (e.g. in case of a defect) and that the chain of interconnected machines may be shortened or lengthened at will, to the extend permitted by the available fluid pressure; also, more than one junction 19 may be provided on any machine which has more than one pneumatically operated implement associated therewith. The outlet 27 is, of course, representative of any number of such outlets provided along line 26 to serve the necessary number of work stations; naturally, the high-pressure fluid conveyed in pipe 26 could also be utilized for other purposes (e.g. steam heating).

I claim:

1. In an industrial sewing machine provided with a pneumatically operable thread cutter, in combination, a frame, a tube for pneumatic fluid supported on said frame, said tube being provided with a male termination on one side of said frame and with a complementary female termination on the opposite side of said frame, said male termination being receivable in a complementary outlet of a fluid-supply line whereby a group of such machines may be serially connected to said line with the male termination of a subsequent machine matingly received in the female termination of an immediately preceding one, self-closing valve means in said female termination adapted to be held open by a male termination inserted therein, said tube being further provided with a discharge port intermediate its terminations, and conduit means leading from said discharge port to said thread cutter.

2. An industrial plant comprising a plurality of sewing machines each having a pneumatically operable thread cutter; a main fluid-supply line common to all said machines and provided with an outlet forming a female coupling member; first self-closing valve means in said outlet; a branch line divided into a plurality of series-connected sections, each of said sections being supported on a respective one of said machines and being provided with a male termination at one end and with a complementary female termination at the other end; second self-closing valve means in said female termination, said male termination of the first one of said sections being detachably received in said female coupling member and maintaining said first valve means open, said male termination of each subsequent section being detachably received in said female termination of the immediately preceding section and maintaining said second valve means thereof open, each of said sections being provided with a discharge port intermediate its male and female terminations; and conduit means connecting said discharge port of each section with said thread cutter of the respective machine for delivering high-pressure fluid thereto.

3. An industrial plant comprising a plurality of mobile sewing machines each having a frame and a pneumatically operable thread cutter supported on said frame; a main fluid-supply line common to all said machines and provided with an outlet forming a female coupling member; first self-closing valve means in said outlet; a branch line divided into a plurality of series-connected sections, each of said sections being supported on the frame of a respective one of said machines and being provided with a male termination at one end and with a complementary female termination at the other end; second self-closing valve means in said female termination, said male termination of the first one of said sections being detachably received in said female coupling member and maintaining said first valve means open, said male termination of each subsequent section being detachably received in said female termination of the immediately preceding section and maintaining said second valve means thereof open, each of said sections being provided with a discharge port intermediate its male and female terminations; and conduit means connecting said discharge port of each section with said thread cutter of the respective machine for delivering high-pressure fluid thereto.

References Cited by the Examiner

UNITED STATES PATENTS

| | | | |
|---|---|---|---|
| 2,271,343 | 1/1942 | Ornell | 137—614 X |
| 2,279,146 | 4/1942 | Schneller | 285—277 |
| 2,369,026 | 2/1945 | Dasher | 112—155 X |
| 2,681,021 | 6/1954 | Kindseth | 112—252 X |
| 2,706,646 | 4/1955 | Olson | 137—614.04 |
| 2,824,436 | 2/1958 | Stack | 112—252 X |
| 2,914,010 | 11/1959 | Cohen | 112—252 |
| 3,008,437 | 11/1961 | Herr | 112—252 |
| 3,033,142 | 5/1962 | Winz | 112—155 X |
| 3,076,473 | 2/1963 | Wadey | 137—614 |
| 3,094,031 | 6/1963 | Reeber | 112—252 X |

JORDAN FRANKLIN, *Primary Examiner.*

M. J. COLITZ, *Assistant Examiner.*